United States Patent [19]

Grawey et al.

[11] 3,899,220
[45] Aug. 12, 1975

[54] FLEXIBLE SEALED TRACK BELT

[75] Inventors: Charles E. Grawey, Peoria; Robert W. Untz, Hanna City; Marvin E. Beyers, Peoria, all of Ill.

[73] Assignee: Caterpillar Tractor Co., Peoria, Ill.

[22] Filed: Feb. 19, 1974

[21] Appl. No.: 443,405

Related U.S. Application Data

[63] Continuation-in-part of Ser. No. 282,707, Aug. 22, 1972, abandoned.

[52] U.S. Cl. .................... 305/19; 305/54; 152/182
[51] Int. Cl. ............................................. B60c 27/20
[58] Field of Search ............. 305/19, 35 EB, 37, 38, 305/58, 56, 54, 55; 152/176, 179, 180, 182, 187, 188, 225, 226, 227

[56] References Cited
UNITED STATES PATENTS

| | | | |
|---|---|---|---|
| 2,764,212 | 9/1956 | Double | 152/182 |
| 3,720,448 | 3/1973 | Allen et al. | 305/19 |

*Primary Examiner*—Robert B. Reeves
*Assistant Examiner*—Larry H. Martin
*Attorney, Agent, or Firm*—Phillips, Moore, Weissenberger Lempio & Strabala

[57] ABSTRACT

Track belts designed to fit circumferentially around a pneumatic bladder or tire carcass can be sealed against the ingress of soil and rock between the track shoes attached about the outer periphery of the belt by forming individual and permanent flat sites on the outer circular periphery of the belt so the flat undersurface of each track shoe is nested on a flat shoe site and therefore does not have triangular shaped gaps under its leading and trailing edges. A transverse rib of elastomer, raised from the surface belt between each of the adjacent flat sites further seals the belt in the narrow gaps formed between adjacent track shoes thereby preventing the ingress of soil and rock in these gaps when the shoes pass through a footprint formed as the pneumatic supported system is rolled. In elevation, the outer surface of this pneumatic carcass supported belt is polygonal in appearance with a ridge or rib located at each joint between adjacent flat surfaces of the shoe sites which are circumferentially disposed around the belt.

20 Claims, 8 Drawing Figures

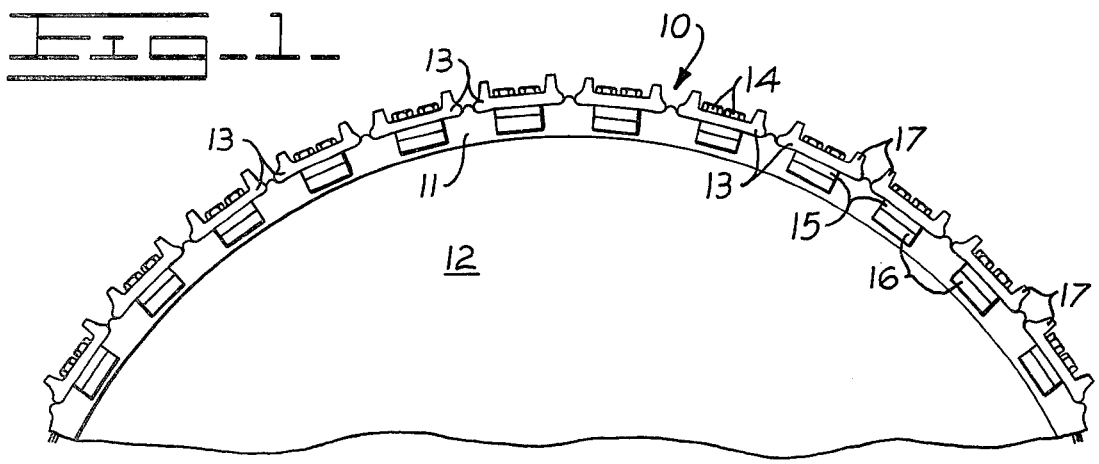
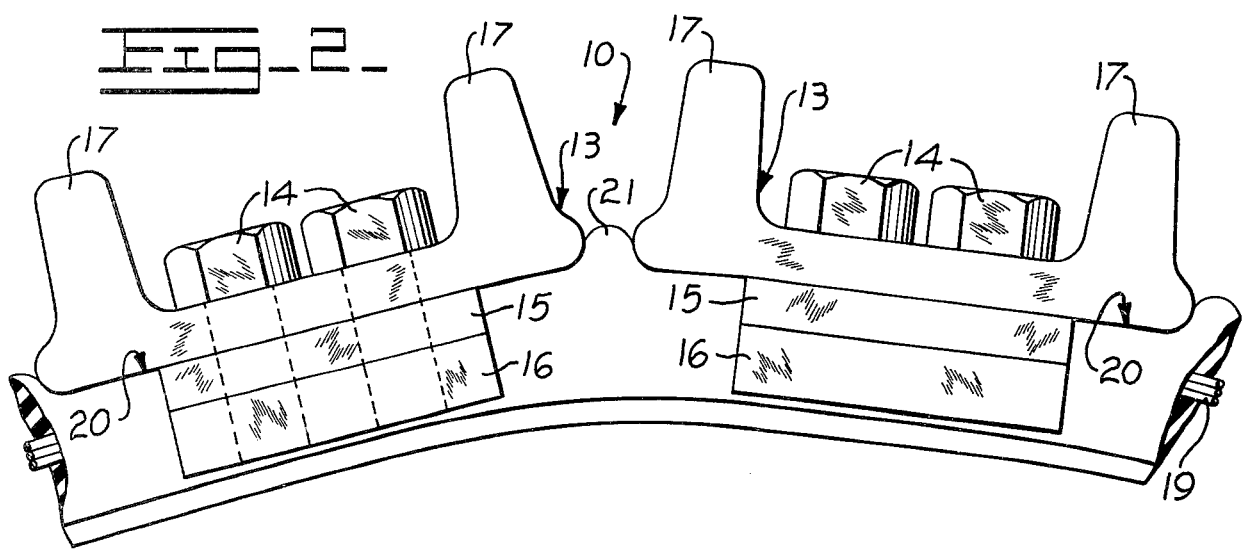
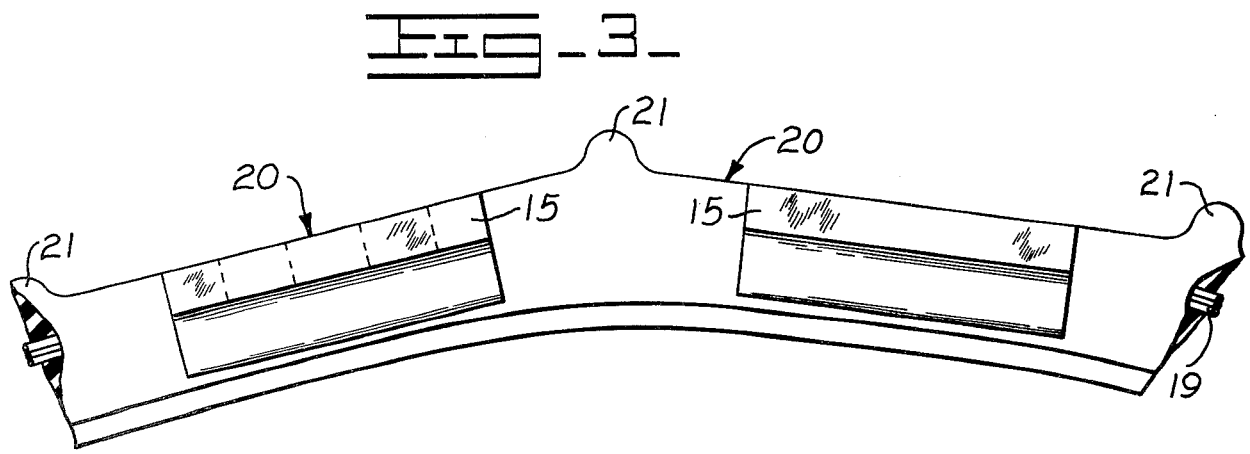

3,899,220

FLEXIBLE SEALED TRACK BELT

This is a continuation-in-part of application Ser. No. 282,707 now abandoned filed Aug. 22, 1972.

BACKGROUND OF THE INVENTION

Flexible track belts having track shoes circumferentially mounted about their periphery are usually composed of a cylindrical elastomer belt, or belts, having a central core or ply of reinforcing within the belts. Track shoes are attached transversely to these internally wire or cable reinforced belts at equally spaced intervals about their outer periphery by placing a keeper bar or plate on the inner periphery of the belt or belts and bolting or fastening an associated track shoe, located on the outer periphery, to the keeper bar so the belt is between the keeper bar and shoe. For example, see U.S. Pat. No. 2,273,950 issued to Galanot et al.

When these belts are placed over a pneumatic supporting carcass, the portions of the belt or belts between adjacent bars conform to the circular periphery of the carcass resulting in generally triangular shaped gaps under the leading and trailing edges of the attached shoes whose flat underside surfaces mount generally tangentially on the arcuate surface of the belt or belts, except to the extent the keeper bar distorts the belt under its shoe. A further example of a track belt is illustrated in this inventor's copending United States Patent application Ser. No. 93,033 filed Nov. 27, 1970 now U.S. Pat. No. 3,773,394 and entitled "Flexible Track Belts."

While these flexible track belts, when supported by a pneumatic carcass and preferably a radially reinforced carcass, provide increased traction, improved floatation and resistance to puncture, the ingress of soil and rock under the leading and trailing edges of the track shoes and between the edges of adjacent shoes cause deterioration of the supporting elastomer belt in these areas.

Thus it is the principal object of this invention to provide a fully sealed track belt that prevents the ingress of soil and rock under and between its track shoes during articulation of the belt and its shoes and to thereby achieve improved service life and better overall performance.

SUMMARY OF THE INVENTION

The above object and many other advantages are obtained by a sealed flexible track belt for employment with pneumatic supporting carcasses which includes a cylindrical elastomer belt having an internal central reinforcing ply formed by a plurality of extensible circular loops in a side-by-side relationship that has a plurality of flat shoe sites permanently formed in the elastomer forming its outer circular periphery with a plurality of track shoes, arranged so one shoe is mounted on each flat shoe site and retained thereon by an associated keeper bar located beneath the reinforcing ply, whereby each flat shoe has a mating flat surface on the belt surface that eliminates gaps under the leading and trailing edges of the shoe. The track belt is further sealed by raised transverse ribs or ridges of elastomer integrally formed in the outer elastomer surface of the belt between the flat shoe sites that prevents the ingress of dirt and rock into the small gap between adjacent track shoes when they have been attached to the belt or belts.

BRIEF DESCRIPTION OF THE DRAWINGS

FIG. 1 is an elevation of the track belt supported on a pneumatic carcass, with the lower half of both the belt and carcass broken away;

FIG. 2 is an enlarged elevation of two adjacent track shoes and a short portion of the belt illustrated in FIG. 1;

FIG. 3 is an elevation similar to FIG. 2 with the track shoes removed to show the permanently formed flat shoe sites separated by a raised sealing rib or ridge between the adjacent sites;

DESCRIPTION OF THE PREFERRED EMBODIMENT

Figure 4:
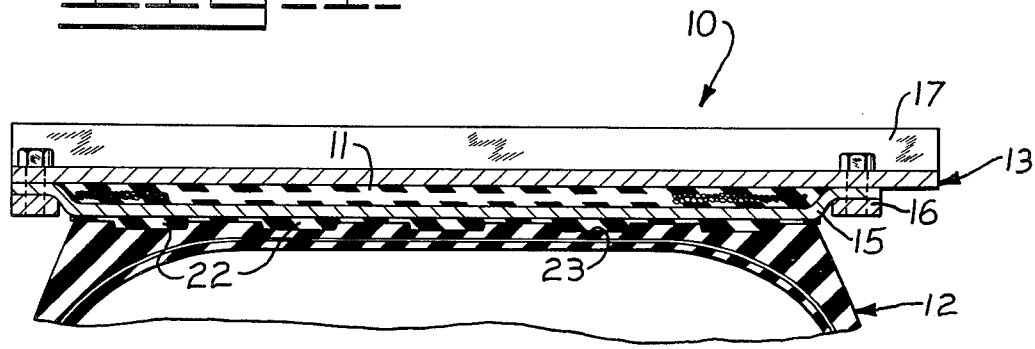
FIG. 4 is a cross-section of the track belt and pneumatic carcass illustrated in FIG. 1.
Figure 5:
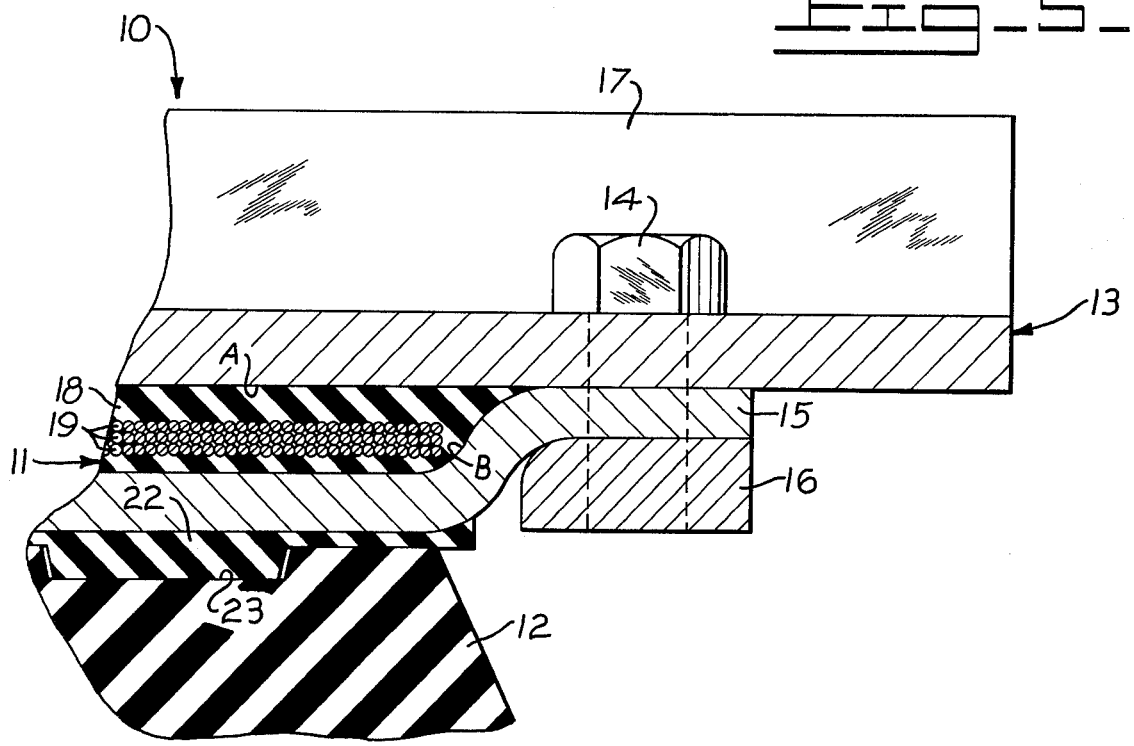
FIG. 5 is an enlarged partial section of one side of the cross-section shown in FIG. 4.

In FIG. 1 an arcuate portion of a cylindrical track belt 10 is shown mounted on a pneumatic supporting carcass 12 which is preferably a radially reinforced carcass, such as shown in this assignee's U.S. Pat. No. 3,606,921 issued to Grawey. However, the track belt can be mounted on other types of tire carcasses. As can be seen in FIG. 1, the sealed track belt included a cylindrical elastomer belt 11 which is mounted about the circular periphery of a pneumatic tire carcass 12. A plurality of track shoes 13 are attached to the outer periphery of the belt with cap bolts 14 which pass through holes in their associated shoe and holes in the ends of an associated keeper plate or bar 15 into a retaining block 16 where threaded bores receive the threaded ends of the cap bolts. The elastomer belt is thus clamped between the keeper bar and the flat underside of its associated track shoe, as best illustrated in FIGS. 4 and 5. With reference to the track shoes, each is illustrated with spaced metal grousers 17, but it should be appreciated that these metal grousers could be replaced with rubber grousers or alternate metal configurations.

Each track shoe 13 is attached in the manner described above as illustrated in FIGS. 4 and 5 so the cylindrical belt 11 is tightly clamped between the flat underside surface A of each track shoe and a channel-shaped recess B formed by bending the ends of the keeper bar 15 upwardly and then outwardly, as illustrated best in FIGS. 4 and 5.

The cylindrical elastomer belt 11 is composed of cured elastomer 18 which surrounds the cylindrical reinforcing plies 19 of the belt which are centrally located therein, three of these plies being shown in FIGS. 4 and 5, and positioned approximately at the neutral bending axis of the elastomer belt. Each cylindrical reinforcing ply is composed of side-by-side circular loops or convolutions of inextensible reinforcing, such as wire, cable or other reinforcing materials such as glass fibers having less than 5 percent elongation under the tension to which the reinforcing loops in the elastomer belt are subjected when it is in use. These cylindrical reinforcing plies may be formed by winding a reinforcing filament about a constant diameter across the width of the cylindrical belt or with closed loops of equal diameters arranged in a side-by-side relationship to form the cylindrical ply.

Normally a circular drum is employed to form the elastomer belt by placing a layer of elastomer of uniform thickness on the drum and then winding the reinforcing filament across this layer to form each ply 19. Subsequently another layer of elastomer is applied over the reinforcing and then the entire belt is cured as a unit. The outer surface is usually wrapped with shrink tape to increase the elastomer density during cure. If desired the keeper bars 15 can be integrally formed with the belt by employing the drum as a base (1) applying a thin layer of elastomer to its surface, (2) locating the keeper bars on this layer, (3) placing elastomer stock between the keeper bars followed by a layer of elastomer to form a circular foundation on which the cylindrical reinforcing plies can be wound and (4) winding the reinforcing plies on this foundation. Thereafter the belt can be completed as described above and subsequently cured, as uncured elastomer is employed in fabricating all the belts. While only a single elastomer belt 11 is shown, it must be appreciated multiple belts could be employed with the instant concept in place of the single belt.

In order to form the flat shoe site 20, best shown in FIGS. 2 and 3, the above procedure of making the belts is modified when the outer layer of elastomer is applied over the cylindrical reinforcing plies by increasing its thickness and flat plates are bolted to the keeper bars 15 or anchors in the drum if the keeper bars are not integrally formed in the belt, prior to curing the elastomer. This procedure will cause the elastomer under these plates to flow forming flat sites on the outer surface of the belt directly beneath each flat plate. Further, a rib or ridge of elastomer is added to the gaps between adjacent plates and ultimately forms the integral transverse sealing rib between adjacent track shoes. Subsequent to the procedure the unit is wrapped with shrink tape and cured as a unit thereby permanently forming these flat shoe sites on the outer surface of the belt. Thereafter, the shrink tape and flat plates are removed and the flat plates are replaced by track shoes 13. It is undesirable to flow the elastomer in the uncured belt extensively since it can disrupt the lay of the reinforcing plies, so it is preferable to add elastomer stock to form the transverse sealing ribs 21, rather than to extrude (flow) adequate elastomer from beneath the flat plates to form these raised ribs.

It must also be appreciated that the flat shoe sites on the surface of the elastomer might be formed in an automated mold having dies for permanently fashioning these flat sites and the ribs on the outer surface of the belt.

As can be appreciated from FIGS. 1, 2 and 3, the outer peripheral surface of the elastomer belt has a permanent polygonal configuration with the adjacent flat surfaces (shoe sites 20) separated by a transverse sealing rib 21. (See in particular FIG. 3).

With this arrangement the underside surface of each track shoe 13 nests with a permanently formed flat track shoe site 20 in a manner that its leading and trailing edges abut against the raised sealing ribs or ridges 21 on opposite sides of its flat shoe site. As a result of this arrangement, the track belt is fully sealed against the ingress of soil and rock under and between the track shoes.

Figure 6:
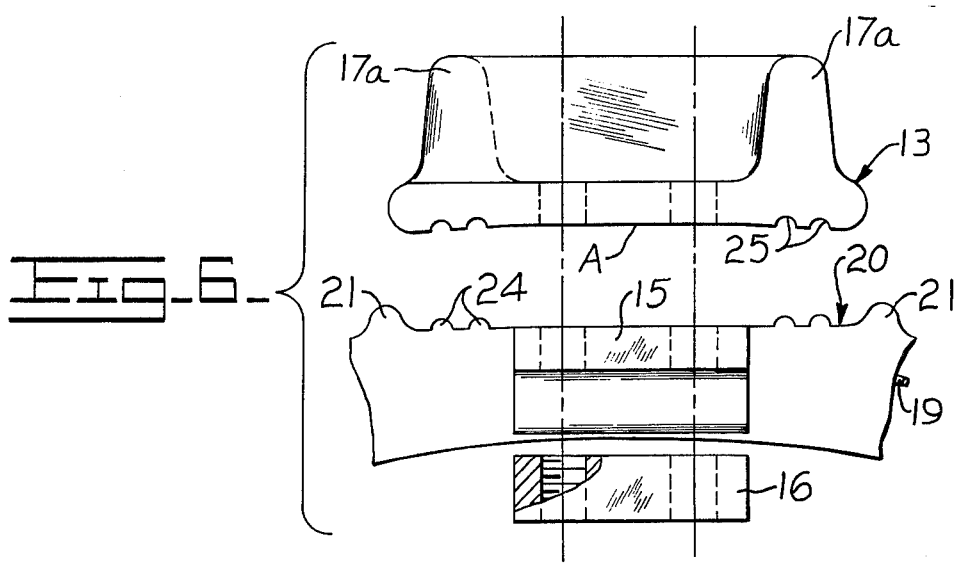
FIG. 6 is an elevation of an enlarged, broken-away portion of an alternate embodiment of the sealed track belt with parts exploded to illustrate the addition of transverse strip seals under the shoe for increased resistance to the ingress of foreign material.

To seal out additional foreign material from between the flat track shoe site 20 and the track shoe 13, transverse sealing strips 24 may be formed on the site adjacent to and parallel to the sealing ribs 21 as illustrated in FIG. 6. These strips, which are considerably smaller in cross-section than the sealing ribs, can be received in matching transverse sealing grooves 25 formed in the underside surface A of the track shoe, which is modified in FIGS. 6, 7 and 8 to illustrate a chevron grouser 17a. Generally these strips and their mating sealing grooves tend to restrict any further advance of foreign materials that are forced past the sealing ribs 21, especially the finer rock particles, such as sand and the like. As a result, the area adjacent to the keeper bars 15 is kept cleaner, enhancing belt life.

Figure 7:
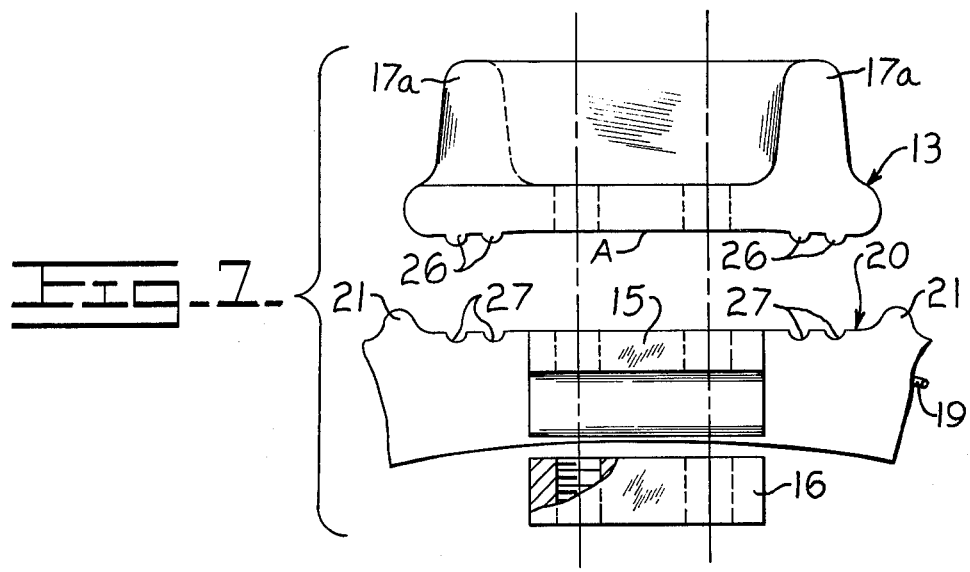
FIG. 7 is a view similar to that shown in FIG. 6 wherein the transverse strip seals are incorporated on the under side of the shoe.
Figure 8:
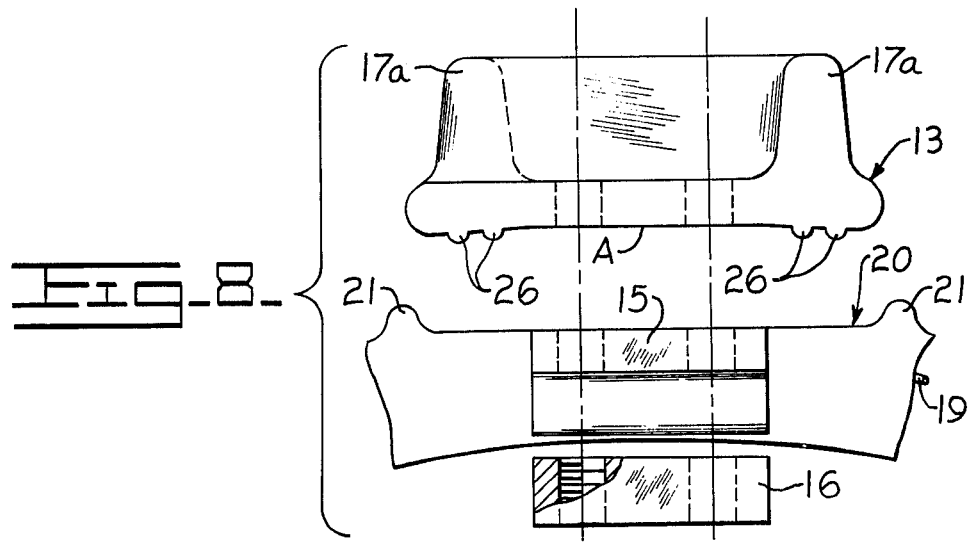
FIG. 8 is a view similar to those shown in FIGS. 6 and 7 illustrating the shoe with the transverse sealing strips combined with the sealed belt illustrated in FIG. 3.

In FIG. 7, metal sealing strips 26 are formed on the underside surface A of track shoe 13 which are received in matched sealing grooves 27 formed in the elastomer of the flat shoe site 20 adjacent to and parallel to the sealing ribs 21. Similar sealing performance can be expected from this variation. Also, the track shoe configured with the metal sealing strips 26 can be employed with the sealed track belt as shown in FIG. 3 to achieve additional sealing, as illustrated in FIG. 8. One or two sealing strips near the elongated edges of the shoes as shown is usually adequate to form this secondary seal As can be seen in FIGS. 4 and 5, the integral version of this track belt includes circumferential lands 22 raised from the inner periphery of the track belt 10 which mate with grooves 23 in the surface of the carcass to stabilize the lateral position of the track belt thereon.

When the keeper bars are integrally formed with the elastomer belt the track belt is fully sealed after the track shoes are properly mounted on the belt. The individual track shoes have their leading and trailing edges rounded, as can be seen in the drawings, so these edges will not cut the elastomer rib between adjacent track shoes.

As this track belt rolls through the footprint the cured elastomer is displaced slightly beneath the leading and trailing edges of the track shoes as they articulate toward an aligned condition. Some of the displacement is absorbed in the pneumatic supporting carcass so that the elastomer is not extruded by this action.

In order to improve the coupling between the reinforcing ply in the belts and the individual track shoes and keepers, a small spacer may be employed to slightly increase the thickness of elastomer in the flat track shoe site so that when the track shoe is attached it can densify the elastomer when the belt is clamped between the shoe and its associated keeper bar, thereby improving the coupling with the reinforcing.

When the keeper bars are channel-shaped, as illustrated in the drawings, and the belt fits closely to the walls thereof, the couple is improved further, as lateral extrusion of the elastomer is prevented when the clamping action takes place.

What is claimed is:

1. A sealed track belt for use around circular pneumatic carcasses comprising:

an integrally cured cylindrical elastomer belt means having at least one cylindrical reinforcing ply centrally located therein so integral inner and outer elastomer layers respectively cover the inner and outer cylindrical surfaces of said cylindrical reinforcing ply, said reinforcing ply being substantially inextensible and said outer elastomer layer having a plurality of permanently formed rectangular flat track shoe sites having a flat surface oriented transversely to said belt means surface and disposed circumferentially about its outer circular periphery whereby its outer circular periphery has a polygonal configuration when the inner diameter of said belt means is in a circular configuration;

a plurality of rectangular track shoes, having an underside surface substantially mating with the flat surface of said flat track shoe sites, one of said track shoes disposed transversely to said cylindrical reinforcing ply on each of said flat track shoe sites;

a plurality of keeper bars, one of said keeper bars disposed under each track shoe so said cylindrical reinforcing ply is between said track shoe and said keeper bar; and attaching means connecting each track shoe with its keeper bar so said elastomer belt means is clamped therebetween.

2. The sealed track belt defined in claim 1 wherein the flat track shoe sites in the outer periphery of the elastomer belt means are separated from one another by a transverse ridge of elastomer integrally formed in the outer surface of said elastomer belt, each of said ridges forming a seal between edges of adjacent track shoes.

3. The sealed track belt defined in claim 2 wherein the cylindrical reinforcing ply is formed by circular loops of reinforcing filament arranged in a side-by-side relationship to form each ply.

4. The sealed track belt defined in claim 3 wherein each keeper bar is channel-shaped to prevent lateral extrusion of elastomer in the elastomer belt means when it is attached to its track shoe and clamps said elastomer belt means therebetween.

5. The sealed track belt defined in claim 4 wherein each track shoe includes spaced grousers on its outer working surface.

6. The sealed track belt defined in claim 5 wherein the keeper bars are integrally formed in the elastomer belt means.

7. The sealed track belt defined in claim 1 wherein the elastomer belt means has at least two concentric cylindrrical reinforcing plies.

8. The sealed track belt defined in claim 1 wherein each cylindrical reinforcing ply is formed with a substantially inextensible metal filament.

9. A sealed track belt for use around circular pneumatic carcasses comprising:

an integrally cured cylindrical elastomer belt means having a plurality of substantially inextensible reinforcing loops arranged in a side-by-side relationship in its central core to form at least one cylindrical reinforcing ply therein so integral inner and outer elastomer layers respectively cover the inner and outer surfaces of said reinforcing ply, said outer elastomer layer having a plurality of flat track shoe sites permanently formed in its outer periphery at equally spaced intervals about its outer circumference causing said track belt to have a polygonal outer configuration when the inner surface of said track belt is cylindrical and a transverse raised ridge of elastomer formed between each of said flat track shoe sites;

a plurality of rectangular track shoes, each having an underside surface conforming to the surface of said track shoe site so its leading and trailing edges will respectively abut against said raised ridge on opposite sides of said associated track shoe site, one of said rectangular track shoes transversely disposed on each said track shoe site;

a plurality of keeper bars, one of said keeper bars located beneath each track shoe positioned on each flat track shoe site with said cylindrical reinforcing ply disposed therebetween; and a plurality of attaching means with one of said attaching means associated with each track shoe and associated keeper bar and operable to pull them together whereby the portion of said elastomer belt means between them is clamped therebetween and open gaps are avoided between the outer surface of said elastomer belt means and said track shoes attached thereto as well as between the edges of adjacent track shoes when the track belt is supported on a circular tire carcass.

10. The sealed track belt defined in claim 9 wherein the keeper bars are channel-shaped to prevent lateral extrusion of elastomer when the elastomer belt means is clamped against the underside surface of a track shoe by said keeper bar.

11. In combination with a circular pneumatic carcass a cylindrical track belt mounted around the circular periphery of said carcass, said track belt having a cylindrical elastomer belt means with a central inextensible cylindrical reinforcing ply so an integral inner and outer layer of elastomer respectively cover the inner and outer surfaces of said cylindrical reinforcing ply said outer layer of elastomer of said elastomer belt means having a plurality of circumferentially disposed flat track shoe sites permanently formed in its outer periphery so its outer periphery is polygonally configured when said track belt is supported on said carcass and a plurality of track shoes, one of said track shoes clamped against each flat track shoe site with a keeper bar located beneath its track shoe and operable to clamp said belt therebetween.

12. The sealed track belt as defined in claim 1 wherein each flat track shoe site includes a plurality of transverse sealing strips adjacent to its several connections to adjacent flat track shoe sites.

13. The sealed track belt as defined in claim 1 wherein each flat track shoe site includes a plurality of transverse sealing grooves adjacent to its several connections to adjacent flat track shoe sites.

14. The sealed track belt as defined in claim 2 wherein each flat track shoe site includes a plurality of transverse sealing strips adjacent to its several connections to adjacent flat track shoe sites.

15. The sealed track belt as defined in claim 2 wherein each flat track shoe site includes a pluraltiy of transverse sealing grooves adjacent to its several connections to adjacent flat track shoe sites.

16. The sealed track belt defined in claim 1 wherein the underside surface of each track shoe includes a plurality of transverse raised sealing strips adjacent to its opposite edges.

17. The sealed track belt defined in claim 1 wherein the underside surface of each track shoe includes a plurality of transverse sealing grooves adjacent to its opposite edges.

18. The sealed track belt defined in claim 9 wherein the underside surface of each track shoe includes a plurality of transverse raised sealing strips adjacent to its opposite edges.

19. The sealed track belt defined in claim 18 wherein the transverse raised sealing strips on the underside surface of each track shoe are located adjacent and parallel to its leading and trailing edges.

20. The sealed track belt defined in claim 19 wherein each flat track shoe site has a plurality of transverse sealing grooves arranged to receive the sealing strips on its associated track shoe.

* * * * *